US009685735B1

(12) United States Patent
Chen et al.

(10) Patent No.: US 9,685,735 B1
(45) Date of Patent: Jun. 20, 2017

(54) ELECTRICAL CONNECTOR AND ASSEMBLY MATING WITH A MATING CONNECTOR AND LOADING A CARD

(71) Applicant: FOXCONN INTERCONNECT TECHNOLOGY LIMITED, Grand Cayman (KY)

(72) Inventors: Chin-Yu Chen, New Taipei (TW); Tien-Chieh Su, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/096,553

(22) Filed: Apr. 12, 2016

(30) Foreign Application Priority Data

Feb. 1, 2016 (CN) .......................... 2016 1 0068041
Feb. 1, 2016 (CN) .......................... 2016 1 0068042
Feb. 1, 2016 (CN) .......................... 2016 1 0068043

(51) Int. Cl.

*G06K 13/06* (2006.01)
*H01R 13/635* (2006.01)
*H01R 24/62* (2011.01)
*H01R 12/73* (2011.01)
*H01R 13/428* (2006.01)
*H01R 107/00* (2006.01)

(52) U.S. Cl.

CPC ........... *H01R 13/635* (2013.01); *H01R 12/73* (2013.01); *H01R 13/428* (2013.01); *H01R 24/62* (2013.01); *H01R 2107/00* (2013.01)

(58) Field of Classification Search

CPC ........ H01R 13/62938; H01R 13/62955; H01R 13/62933; H01R 13/743; H01R 13/74; H01R 13/745; G06K 13/08; G06K 13/0806

USPC ................................ 439/557, 555, 157, 159

See application file for complete search history.

(56) References Cited

U.S. PATENT DOCUMENTS

| | | | | |
|---|---|---|---|---|
| 6,319,029 B2 * | 11/2001 | Nishioka | ........................ | 439/159 |
| 6,338,636 B2 * | 1/2002 | Nishioka | ........................ | 439/157 |
| 7,865,210 B2 | 1/2011 | Wang et al. | | |
| 8,376,764 B1 * | 2/2013 | Su | ...................... | G06K 13/0831 439/157 |
| 8,460,036 B1 * | 6/2013 | Chen | .................. | H01R 13/6474 439/660 |
| 8,651,884 B1 | 2/2014 | Rivera | | |
| 9,178,311 B1 * | 11/2015 | Rivera | ................. | H01R 13/635 |
| 2009/0093147 A1 * | 4/2009 | Yu | ...................... | G06K 13/0806 439/159 |

(Continued)

FOREIGN PATENT DOCUMENTS

CN 204481257 8/2015

*Primary Examiner* — Gary Paumen

(74) *Attorney, Agent, or Firm* — Wei Te Chung; Ming Chieh Chang

(57) ABSTRACT

An electrical connector includes a module and a shell enclosing the module. The module includes an insulative housing and a number of terminals affixed to the insulative housing, the insulative housing having a base portion and a tongue portion extending forwardly from the base portion, each terminal having a contact portion exposed on the tongue portion. The shell defines a mating port at a front portion thereof for mating with a mating connector, and a card receiving cavity at a rear portion thereof for loading a card.

20 Claims, 20 Drawing Sheets

(56) References Cited

U.S. PATENT DOCUMENTS

2015/0207270 A1* 7/2015 Zhang ................ G06K 13/0831
439/159

* cited by examiner

ELECTRICAL CONNECTOR AND ASSEMBLY MATING WITH A MATING CONNECTOR AND LOADING A CARD

BACKGROUND OF THE INVENTION

1. Field of the Invention

The present invention relates to an electrical connector and assembly, and more particularly to a USB (Universal Serial Bus) connector adapted for being normally and reversely mating with a mating connector and loading a card.

2. Description of Related Art

China Patent No. 204481257, issued on Jul. 15, 2015, discloses a USB socket connector mounted in an electronic device and defines a mating port in a front portion thereof for mating a mating plug. The socket connector includes an insulative housing, an upper row of terminals and a lower row of terminals arranged on the insulative housing. The upper row of terminals are reversely symmetrical to the lower row of terminals.

U.S. Pat. No. 7,865,210, issued on Jan. 4, 2011, discloses a card connector mounted in an electronic device and defines a port. The card connector comprises a housing fixed in the electronic device and a tray insertable through the port for loading a card.

U.S. Pat. No. 9,178,311, issued on Jan. 4, 2015, discloses an electrical connector received in an electronic device defining a port and including a USB connector connected with a tray carrying a card. The electrical connector is formed with an ejector ejecting the card through the port.

An improved USB socket connector having simple configuration for mating with a mating plug and loading a card is desired.

SUMMARY OF THE INVENTION

Accordingly, an object of the present invention is to provide an electrical connector having a shell defining a mating port mating with a mating plug and defining a card receiving cavity for loading a card.

In order to achieve the object set forth, an electrical connector includes a module and a shell enclosing the module. The module includes an insulative housing and a plurality of terminals affixed to the insulative housing, the insulative housing having a base portion and a tongue portion extending forwardly from the base portion, each terminal having a contact portion exposed on the tongue portion. The shell defines a mating port at a front portion thereof for mating with a mating connector, and a card receiving cavity at a rear portion thereof for loading a card.

The shell encloses the module and defines a mating port mating with a mating plug and defines a card receiving cavity loading the card. The electrical connector defines one mating port mating with the mating connector and loading the card at the shell. The configuration is simple since the shell is utilized to define the card receiving cavity.

Other objects, advantages and novel features of the invention will become more apparent from the following detailed description when taken in conjunction with the accompanying drawings.

DETAILED DESCRIPTION OF THE PREFERRED EMBODIMENT

Figure 1:
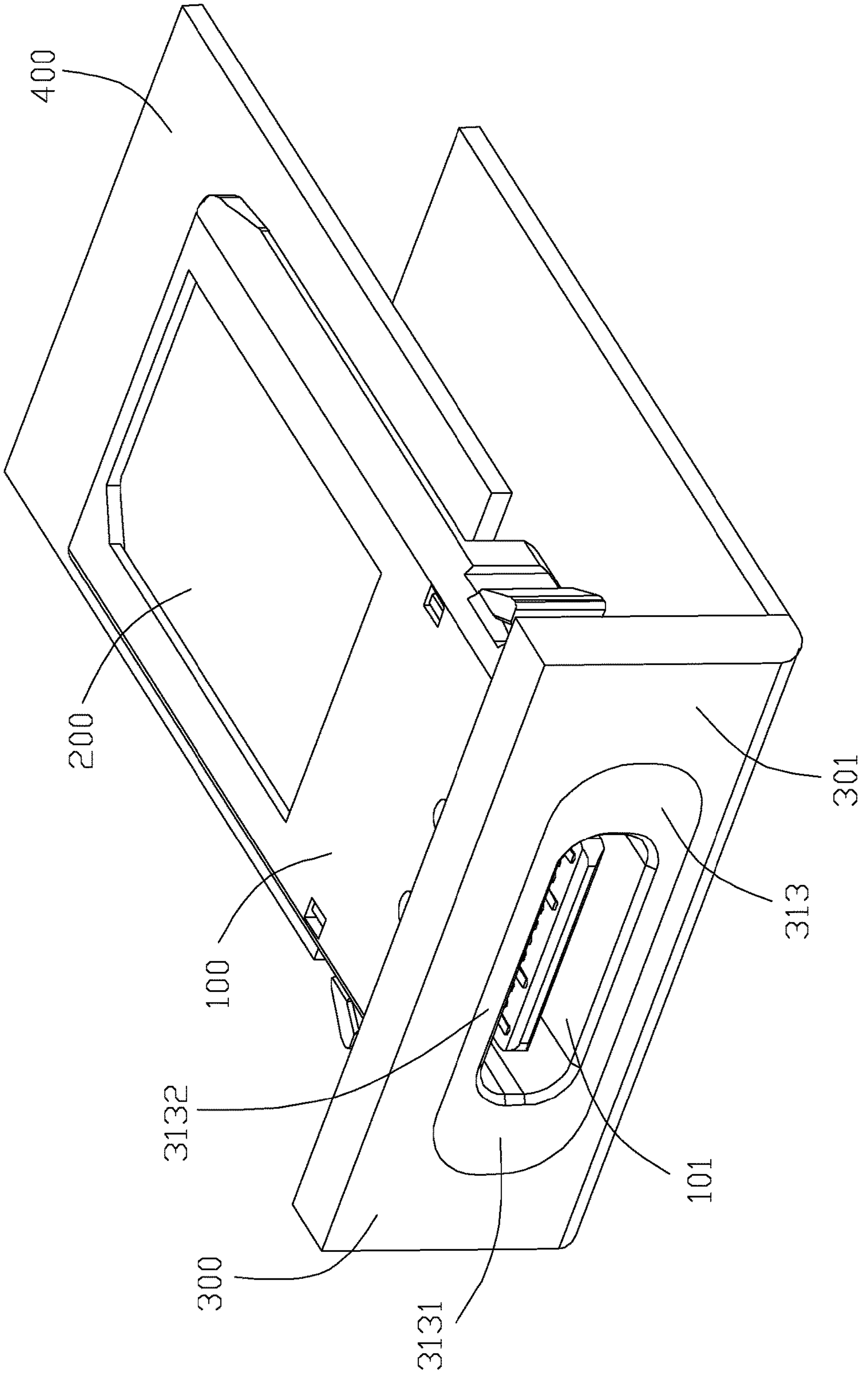
FIG. 1 is an assembled perspective view showing an electrical connector mounted in an electronic device, carrying a card and connected with a circuit board in accordance with the present invention.
Figure 2:
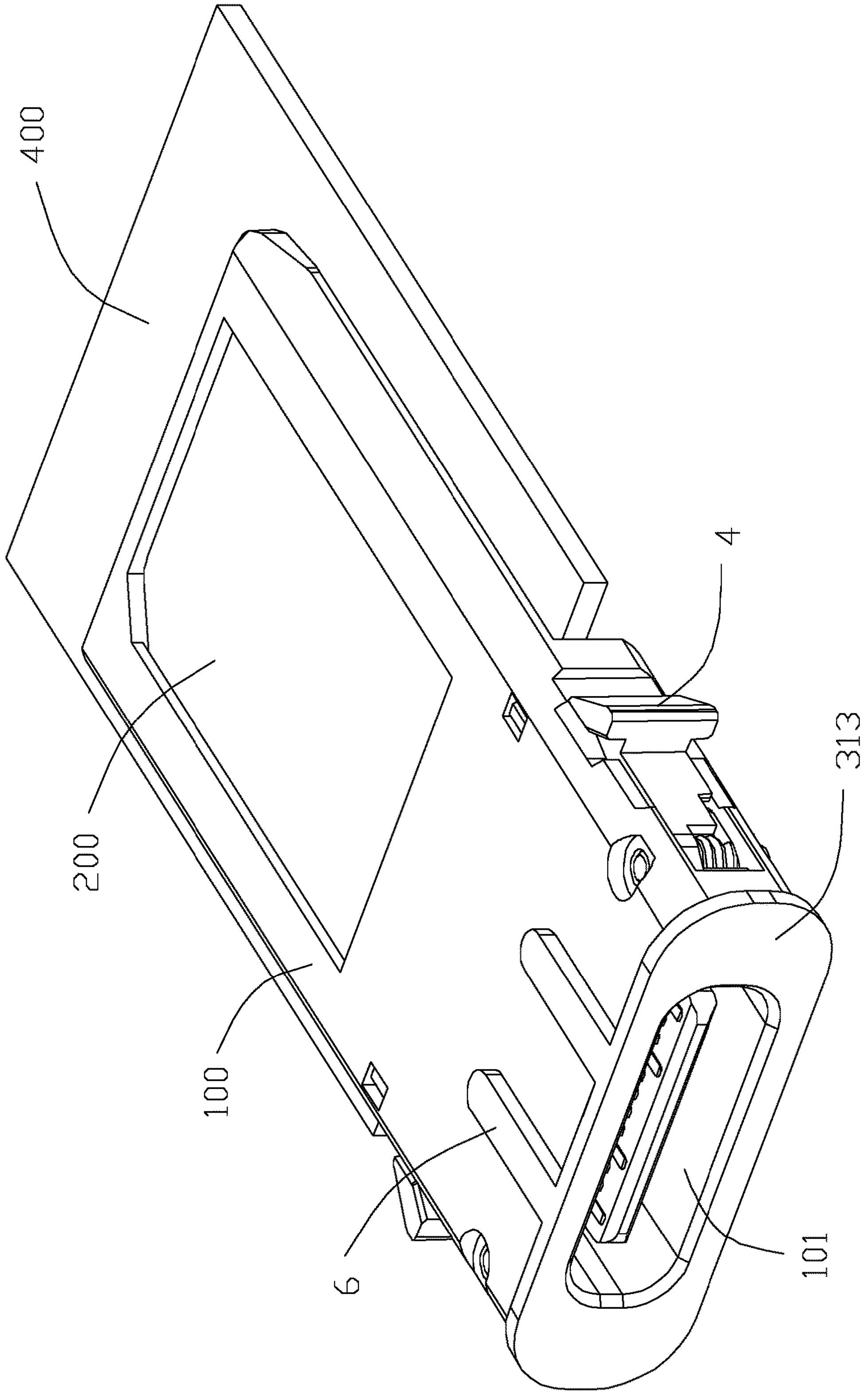
FIG. 2 is an assembled perspective view showing the electrical connector and the circuit board.

Reference will now be made in detail to the preferred embodiment of the present invention. Referring to FIGS. 1-9, an electrical connector assembly comprising an electronic device 300, e.g., a mobile phone, an I/O (Input/Output) electrical connector 100 insertable into a receiving space (not labeled) in/of the electronic device 300 for loading a card 200, e.g., SIM card. The electrical connector 100 is connected to a circuit board 400.

The electronic device 300 defines a front face 301 with a front opening (not labeled) in front of and in alignment with the receiving space (not labeled), and further with a pair of slots 302, a pair of engaging shoulders 304, and a pair of ejecting mechanisms 303 each pivotable about a pivot 3033. The ejecting mechanism 303 comprises a tail portion 3031 and a head portion 3032. A middle of the head portion 3032 is formed with a downwardly projecting step portion 3034.

Figure 4:
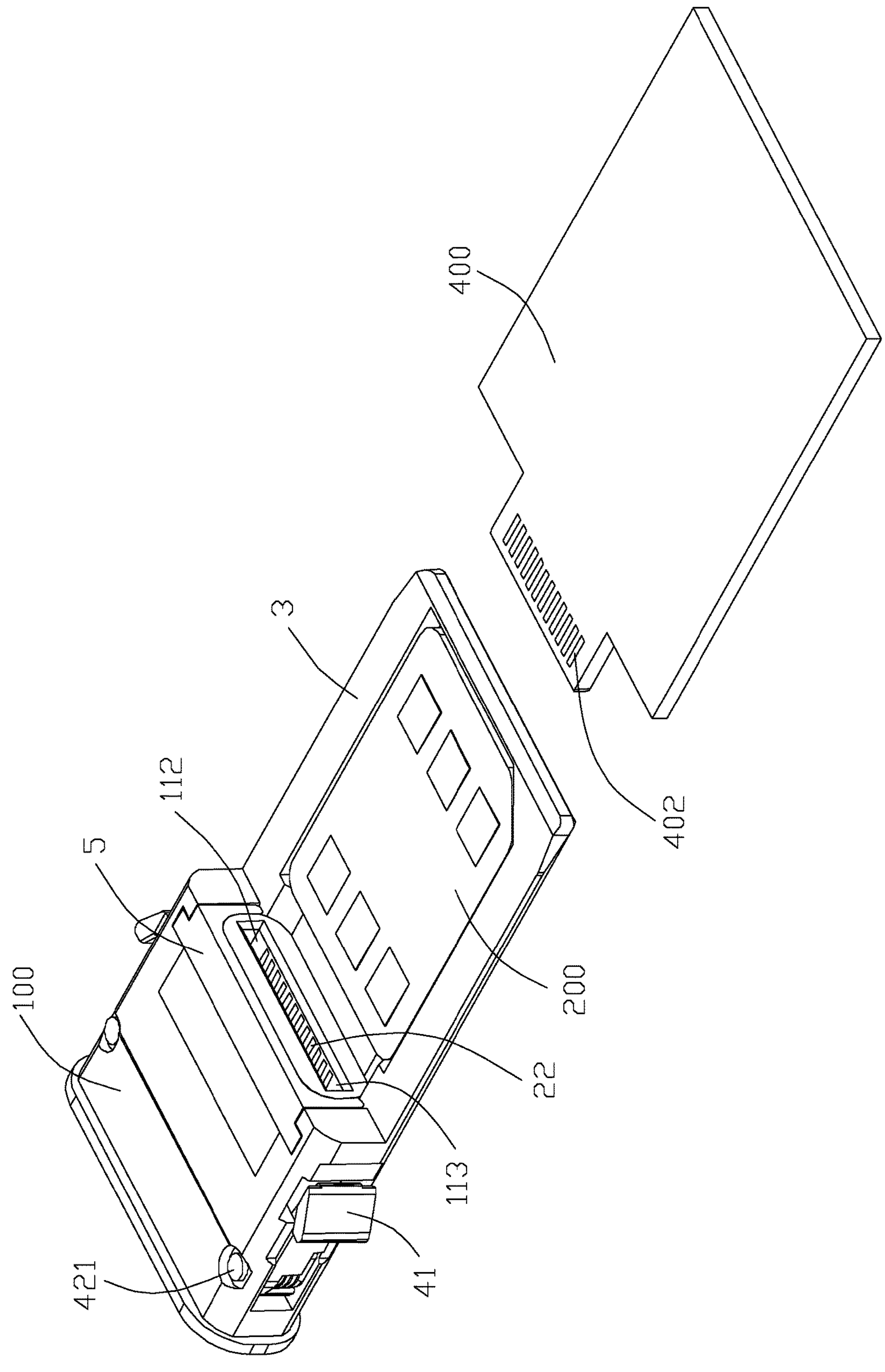
FIG. 4 is another view similar to FIG. 3, taken from another aspect.
Figure 5:
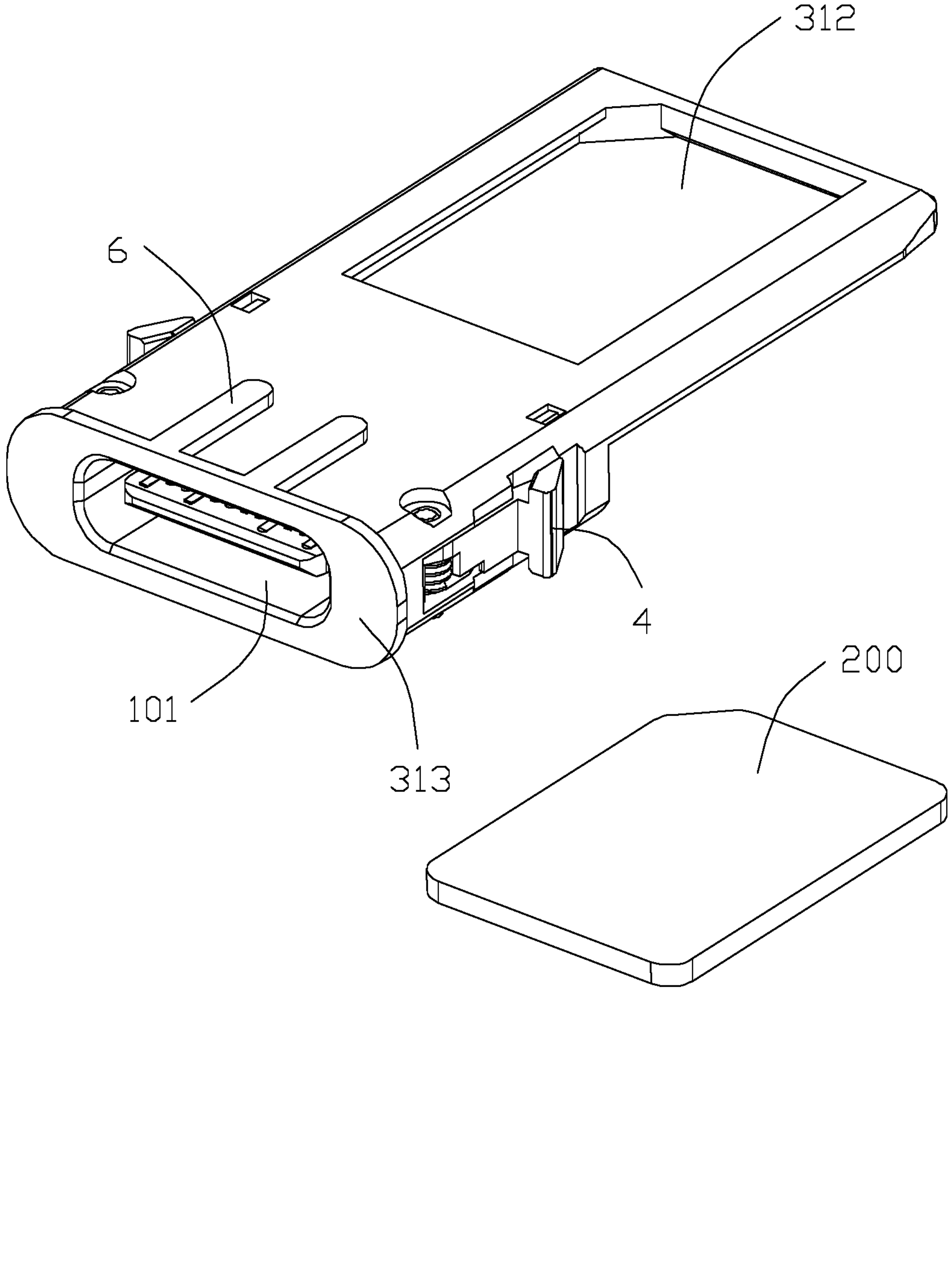
FIG. 5 is a perspective view showing the card separated from the electrical connector.
Figure 6:
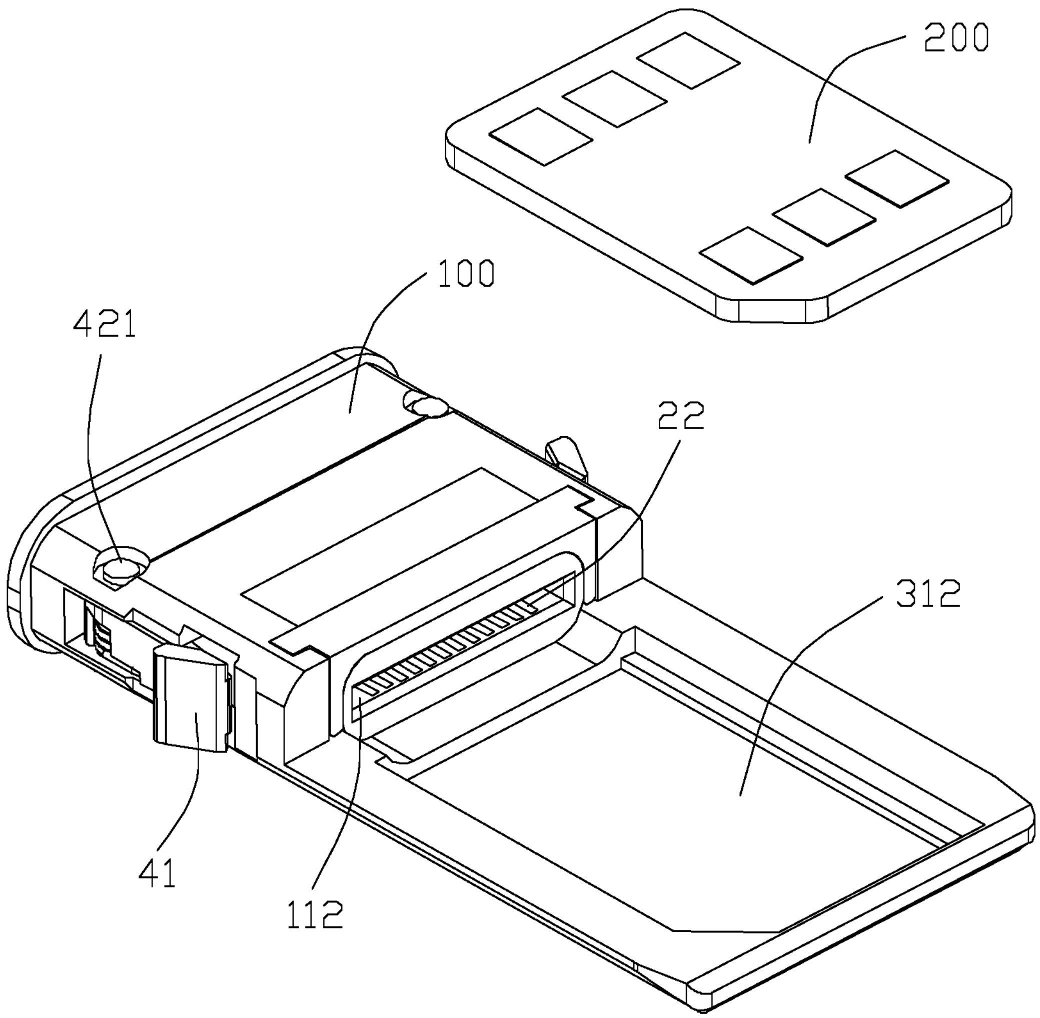
FIG. 6 is a view similar to FIG. 5, taken from another aspect.
Figure 8:
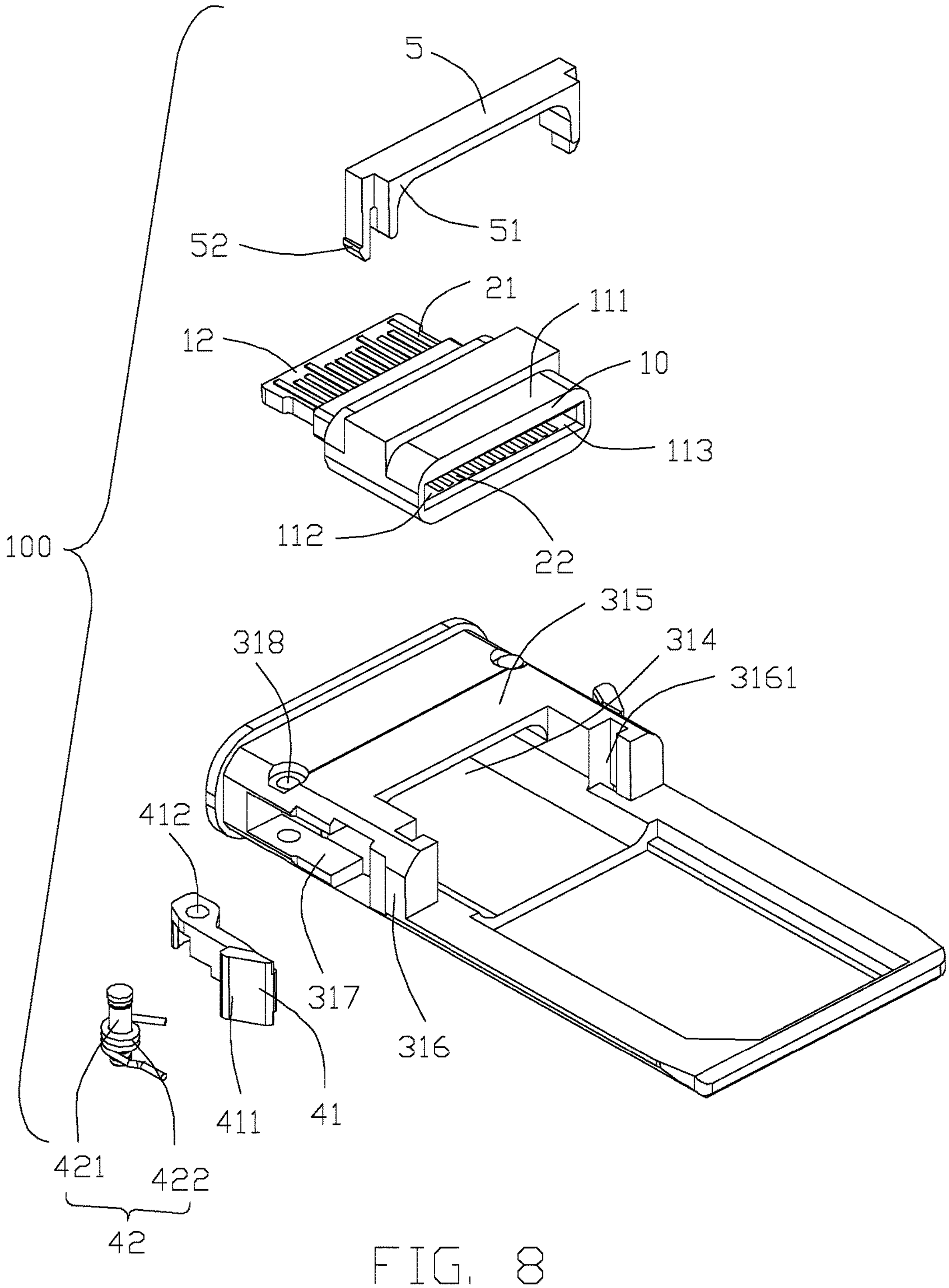
FIG. 8 is another view similar to FIG. 7, taken from another aspect.
Figure 9:
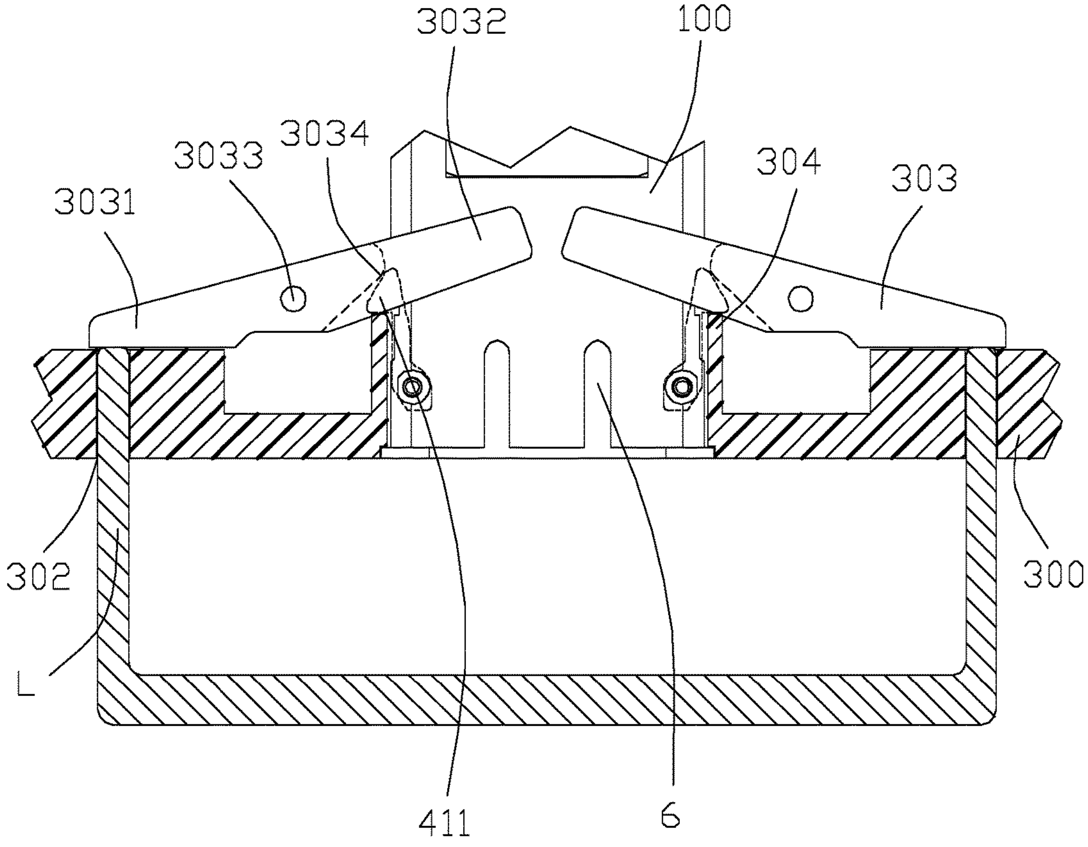
FIG. 9 is a view showing the electrical connector inserted in the electronic device.
Figure 10:
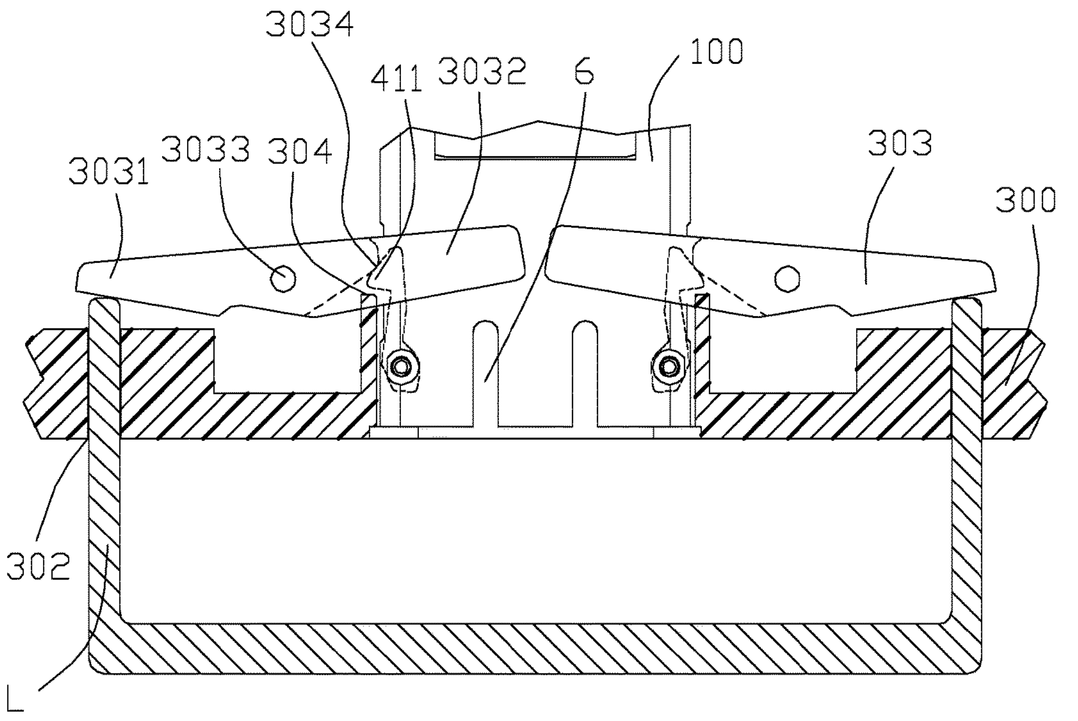
FIG. 10 is a view showing the electrical connector in the electronic device, when two pins begin to push the electrical connector.
Figure 11:
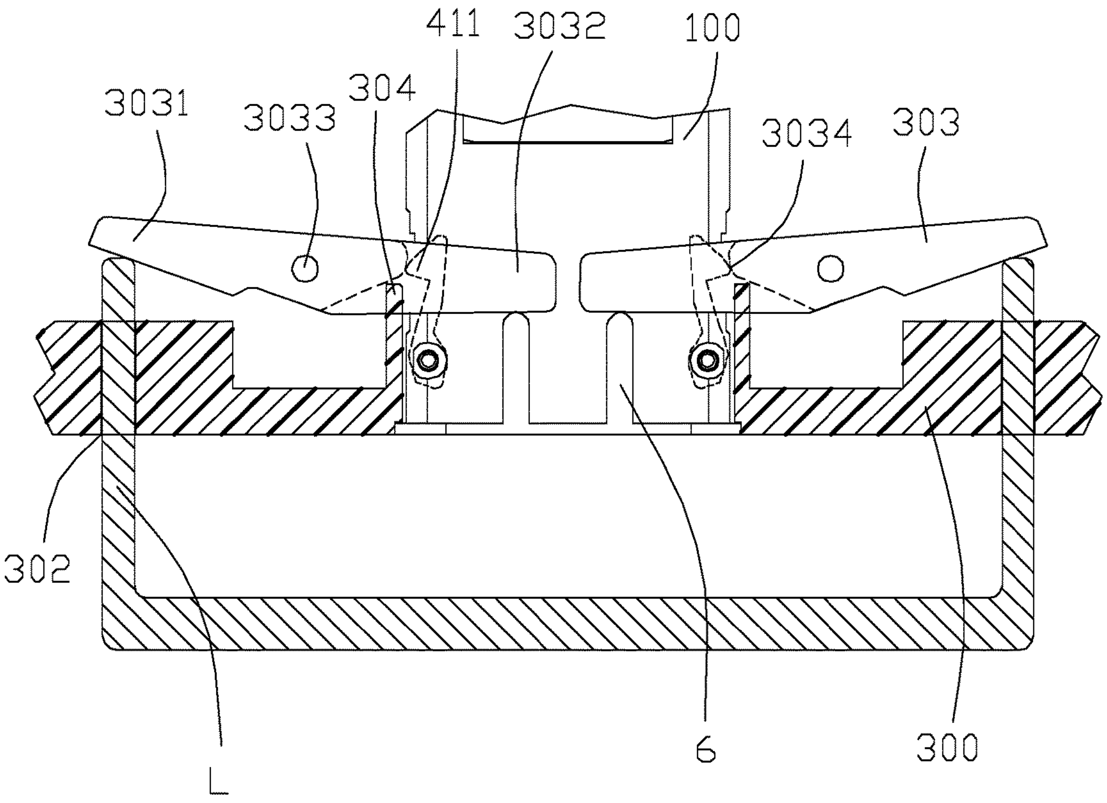
FIG. 11 is a view showing the electrical connector in the electronic device, when latching portions release from the electronic device.
Figure 12:
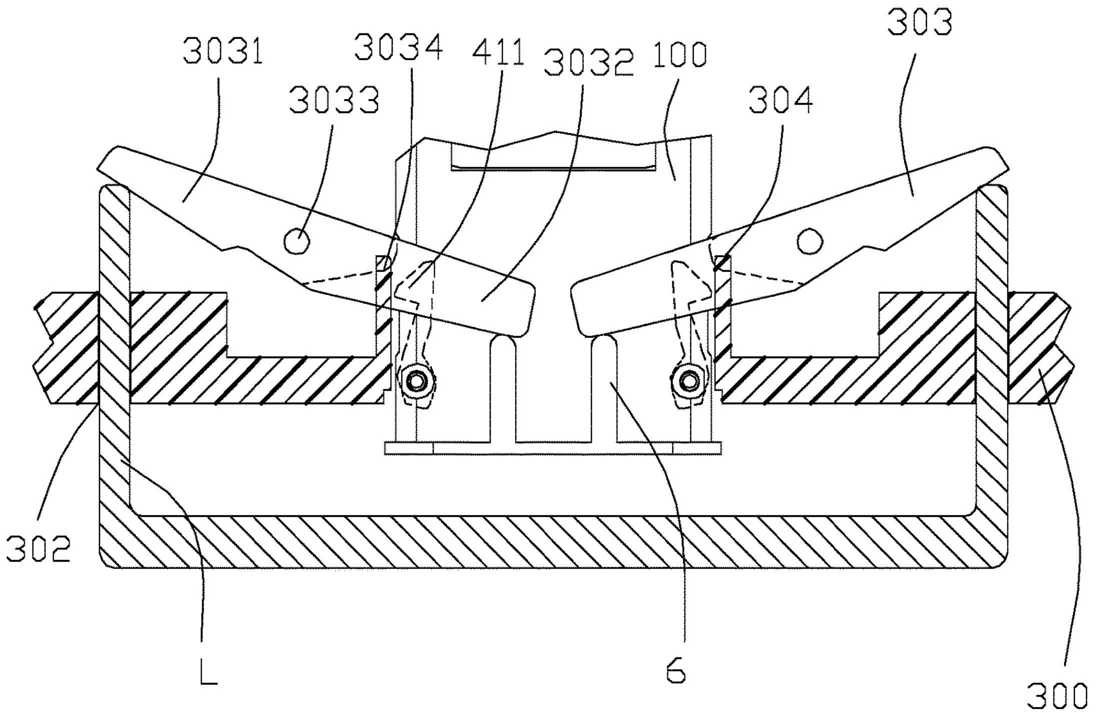
FIG. 12 is a view showing the electrical connector rejected from the electronic device.
Figure 13:
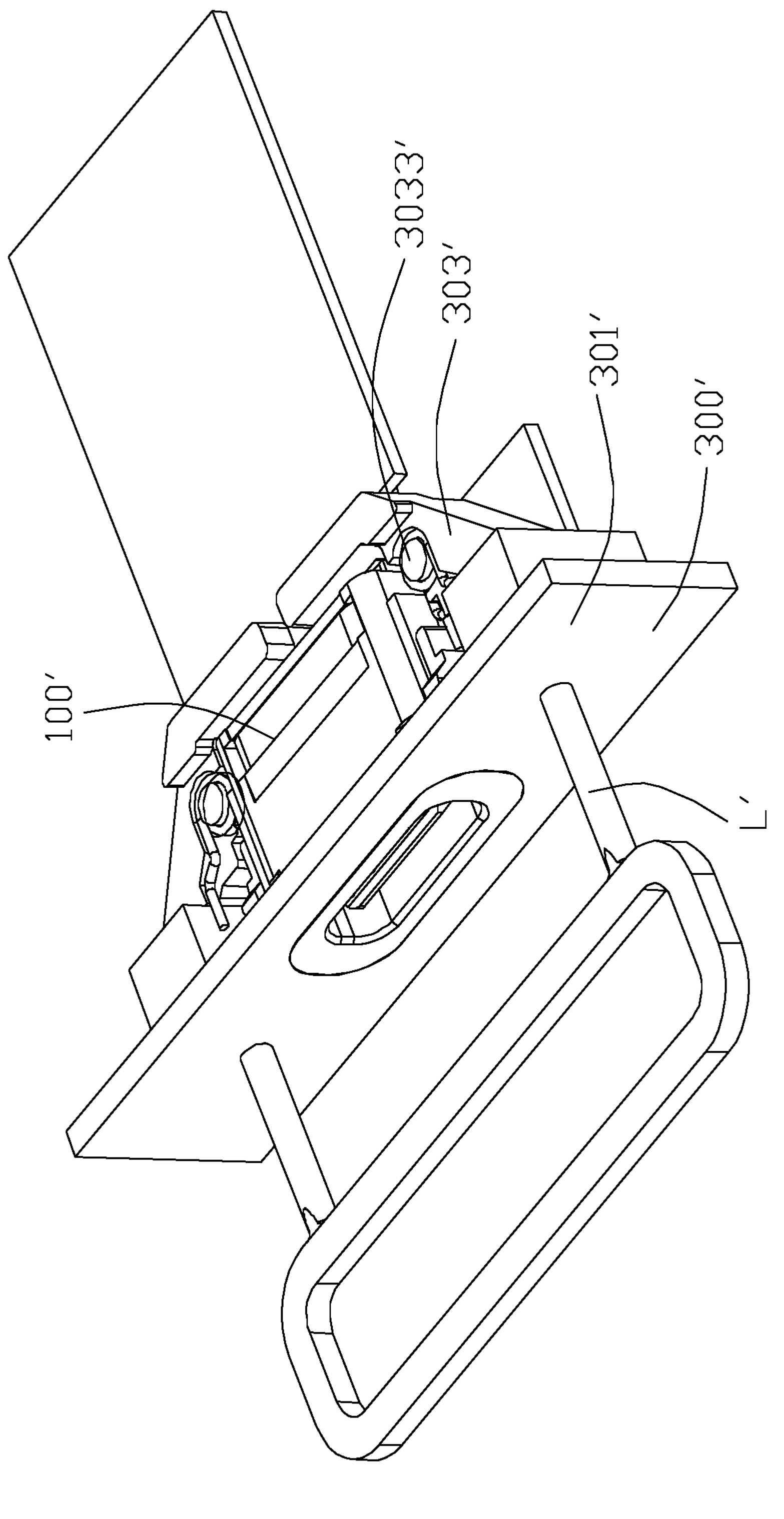
FIG. 13 is a view showing the electrical connector, the electronic device, pins referred in a second embodiment.
Figure 14:
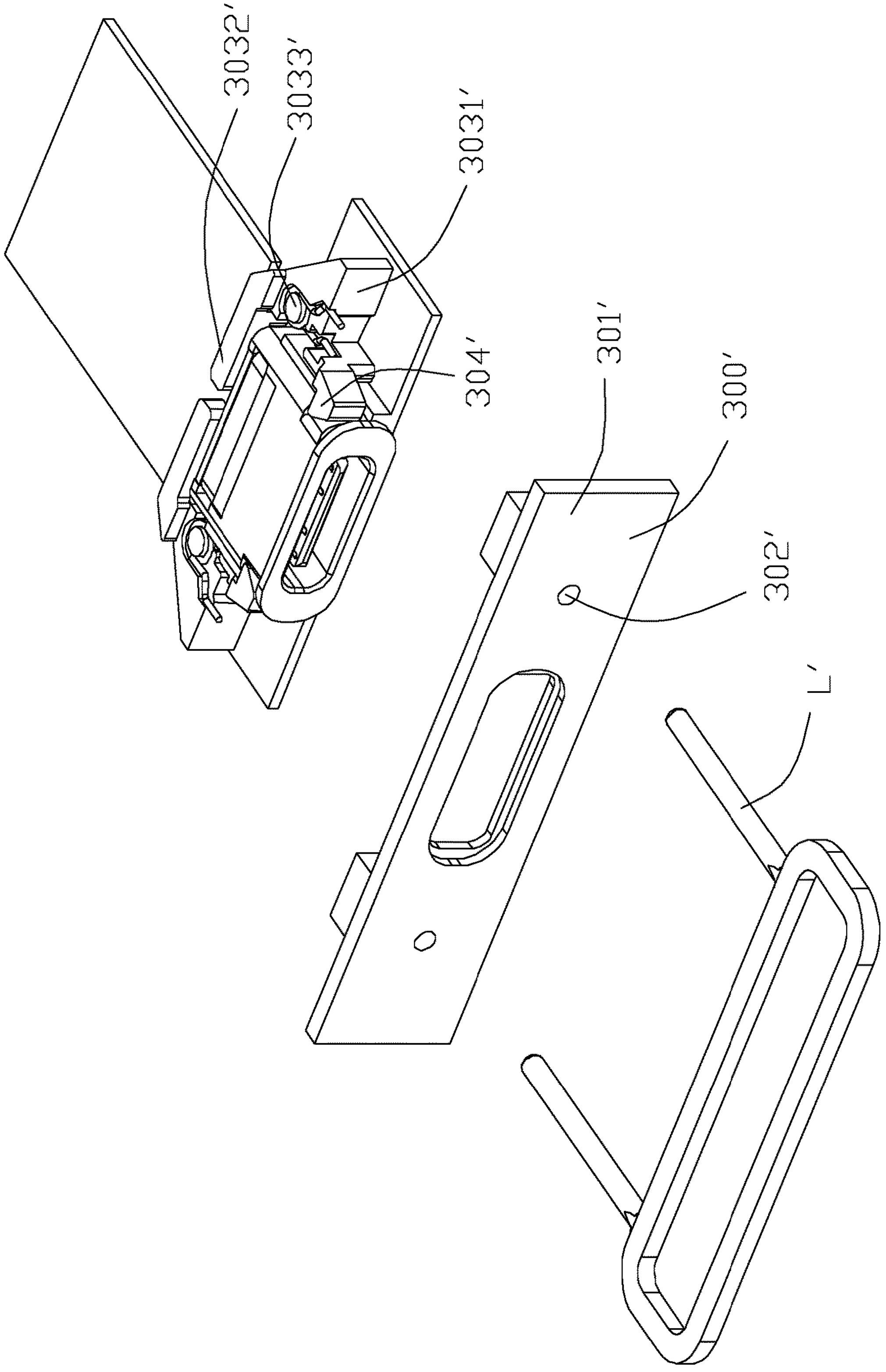
FIG. 14 is a partly exploded view showing the electrical connector, the electronic device, pins referred in the second embodiment.
Figure 15:
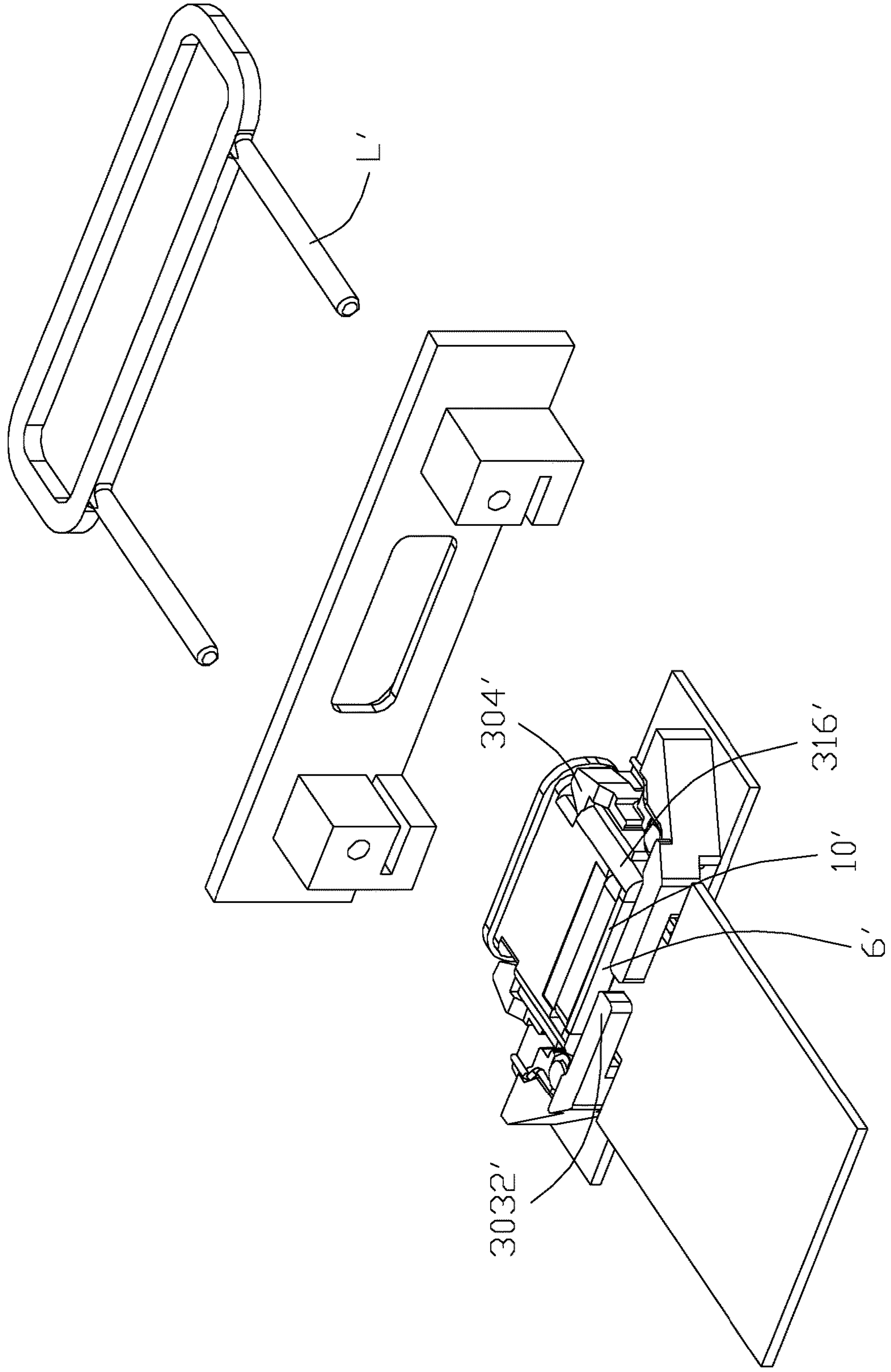
FIG. 15 is another view similar to FIG. 14, taken from another aspect.
Figure 16:
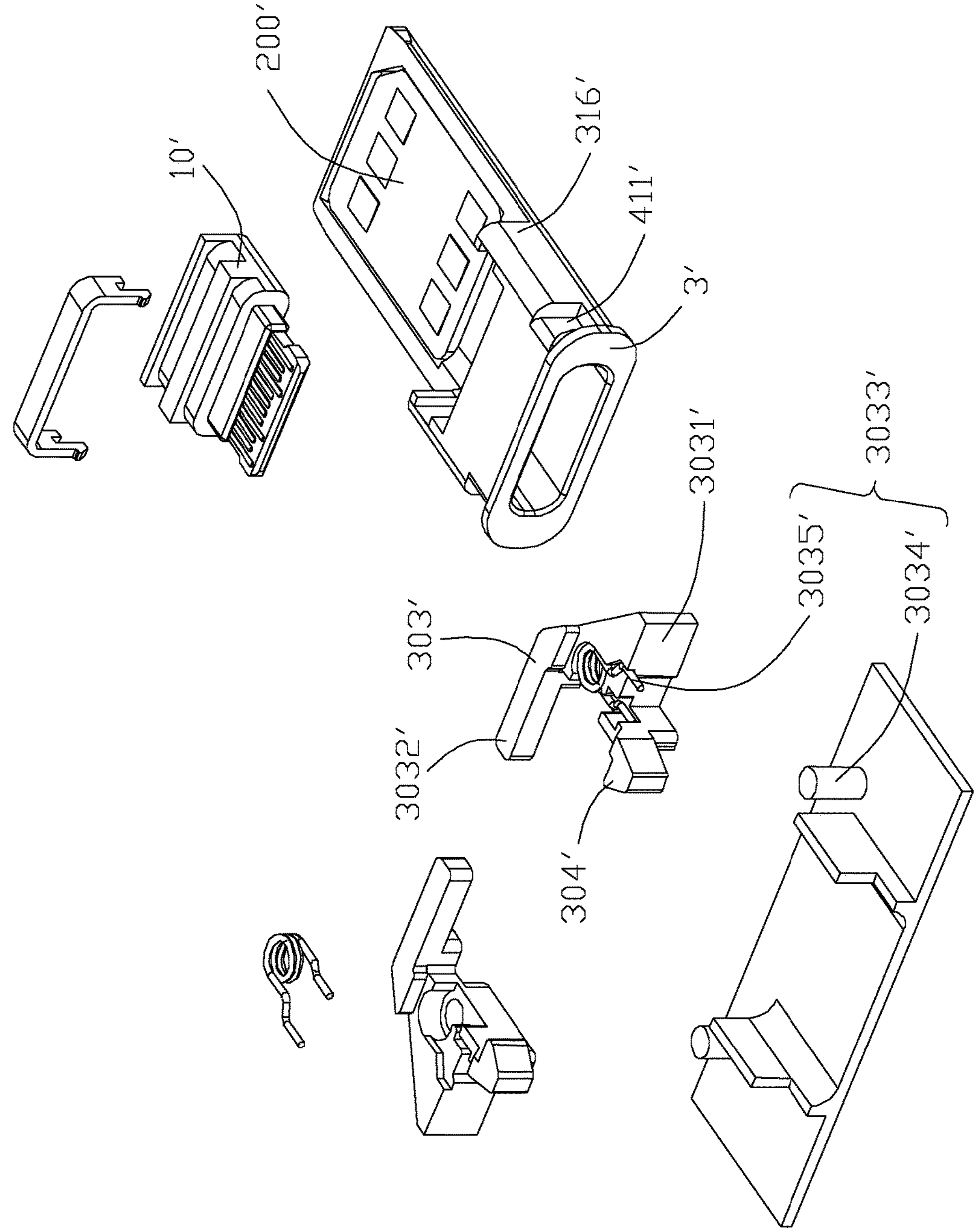
FIG. 16 is an exploded view of FIG. 14.
Figure 17:
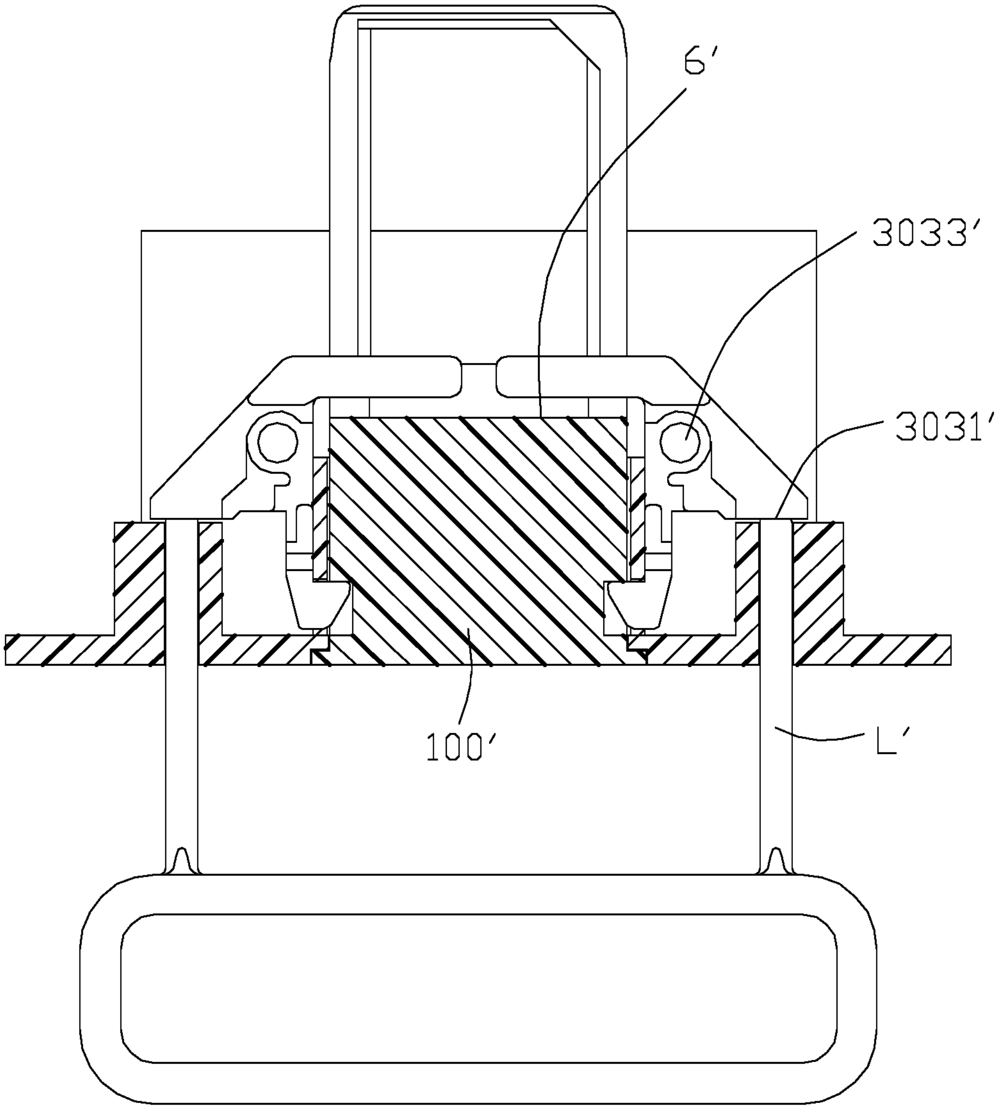
FIG. 17 is a view showing the electrical connector inserted in the electronic device referred in the second embodiment.
Figure 18:
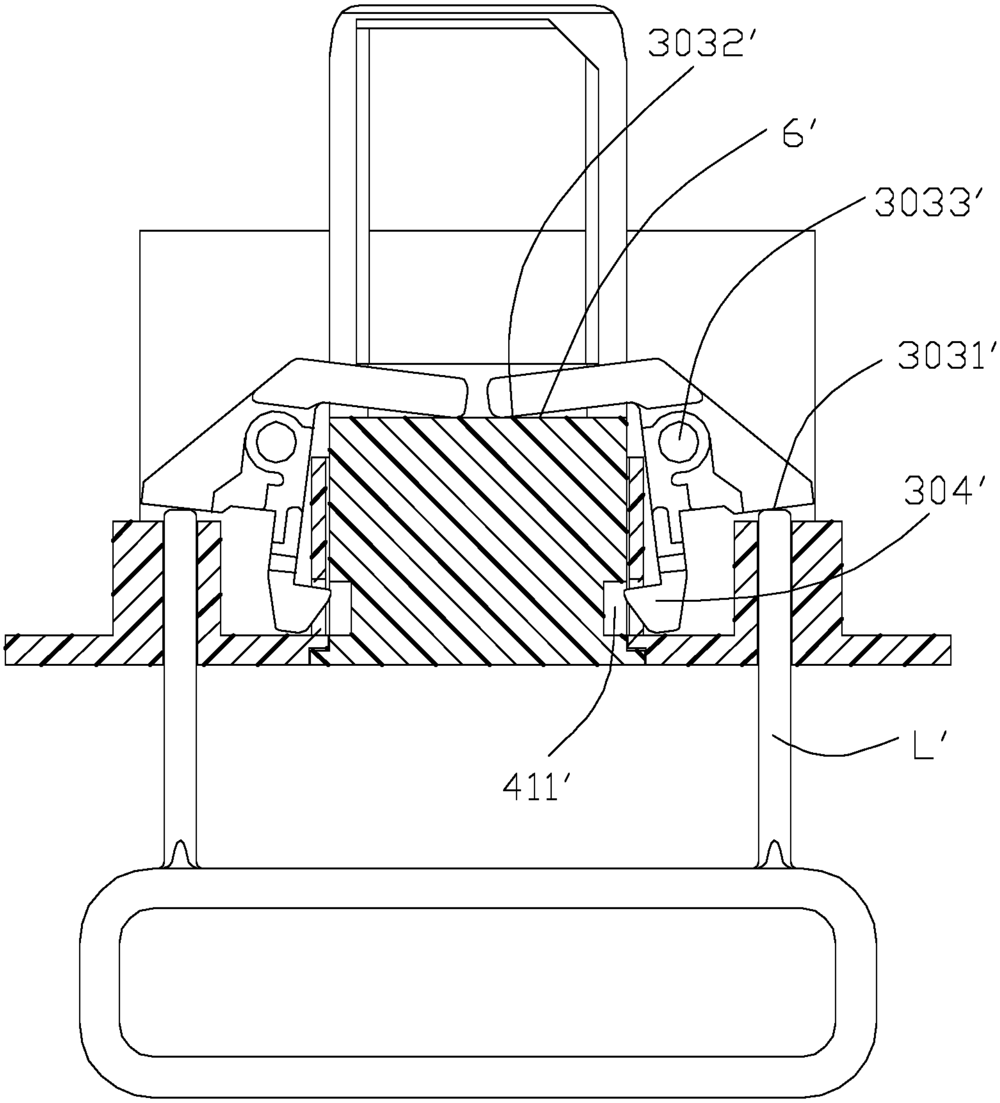
FIG. 18 is a view showing the electrical connector in the electronic device, when two pins begin to push the electrical connector referred in the second embodiment.
Figure 19:
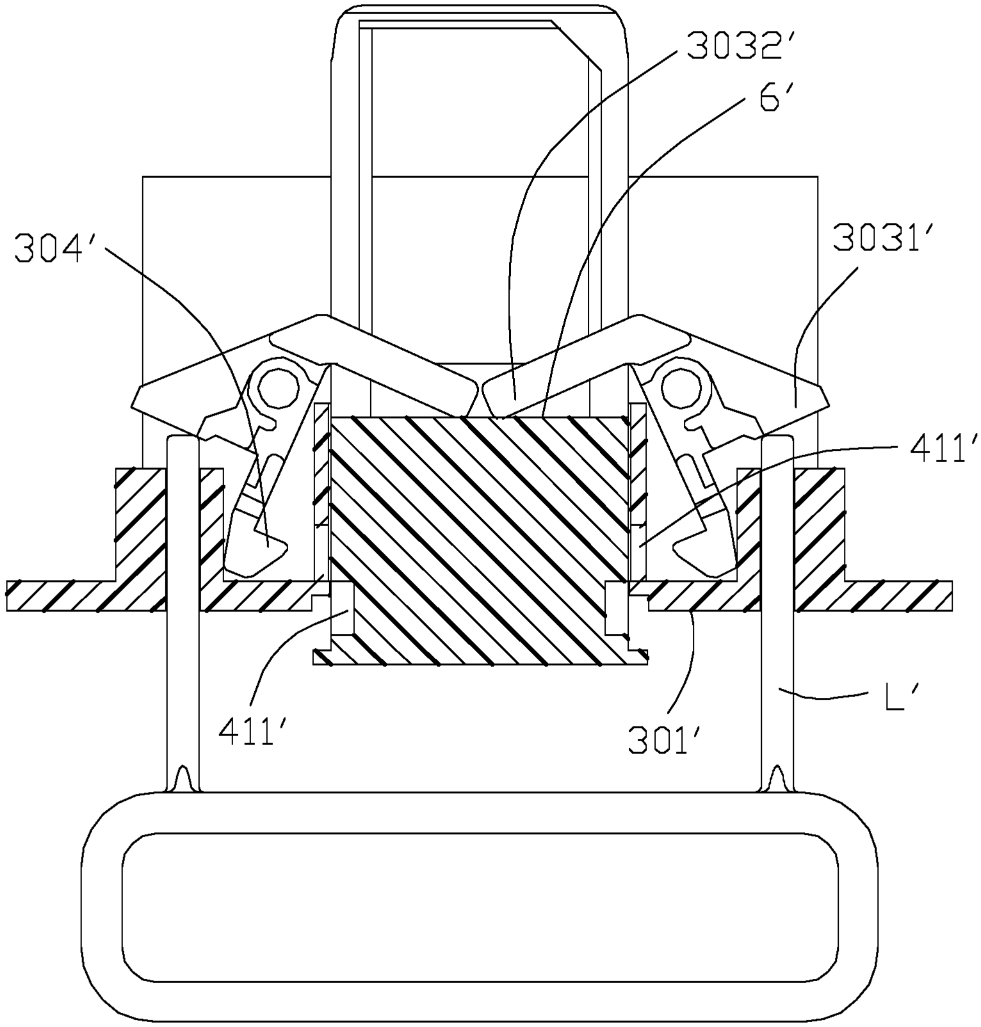
FIG. 19 is a view showing the electrical connector rejected from the electronic device referred in the second embodiment.
Figure 20:
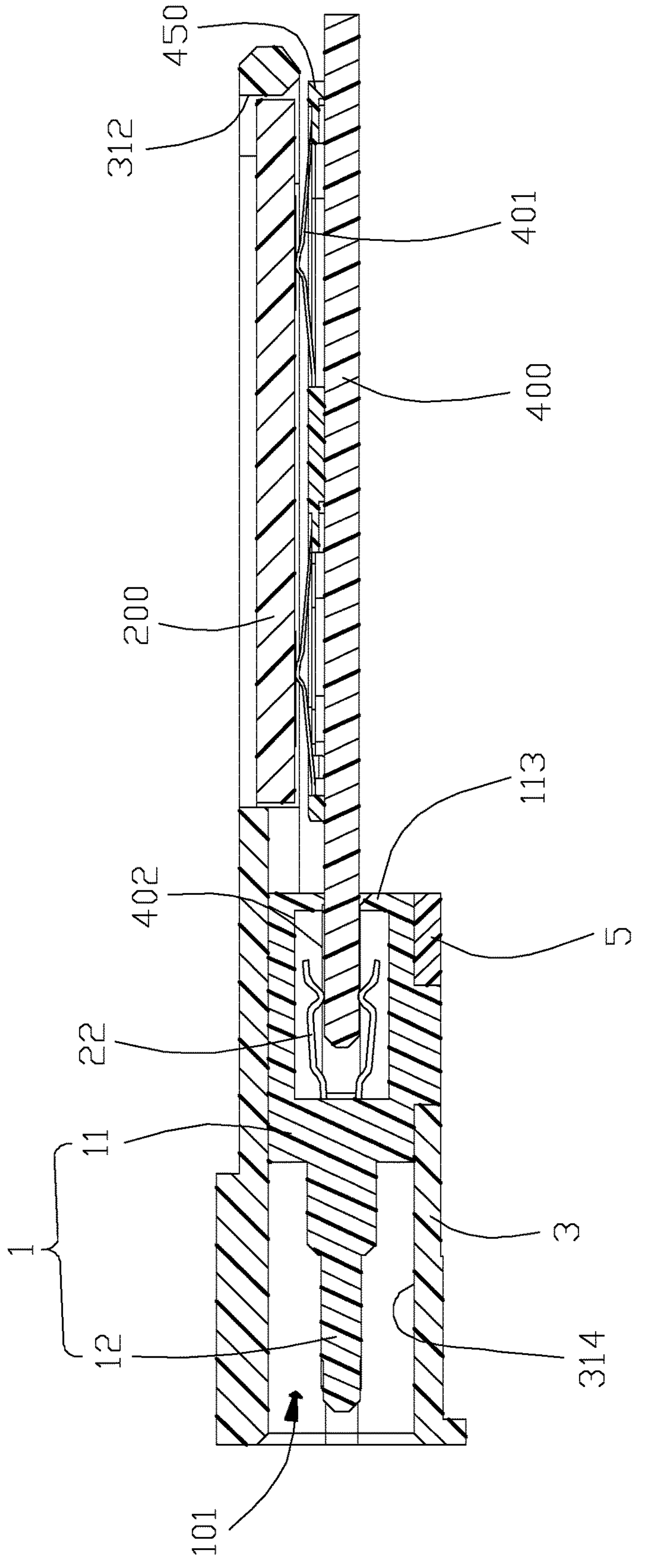
FIG. 20 is a cross-sectional view of the electrical connector mounted in the electronic device in FIG. 2 to show the structural relation among the shell, the module, and the circuit board.

The electrical connector 100 comprises a module 10, a shell 3 enclosing the module 10, a pair of locking mechanisms 4, and a fastening mechanism 5 fastening the module 10 onto the shell 3. The module 10 includes an insulative housing 1 and a plurality of terminals 2 affixed to the insulative housing 1. The insulative housing 1 comprises a base portion 11 and a tongue portion 12 extending forwardly from the base portion 11. Referring to FIG. 8, the base portion 11 has an arc portion 111 formed at a periphery of a rear portion thereof. Referring to FIG. 4, the insulative housing 1 includes platform 113 and a through hole 112 extending through the base portion 11 and functioning as a connecting port for insertion of the circuit board 400.

Each terminal 2 comprises a front contact portion 21 exposed on the tongue portion 12 and a rear connecting portion 22 positioned in the through hole 112 for electrically connecting with the circuit board 400.

Figure 7:
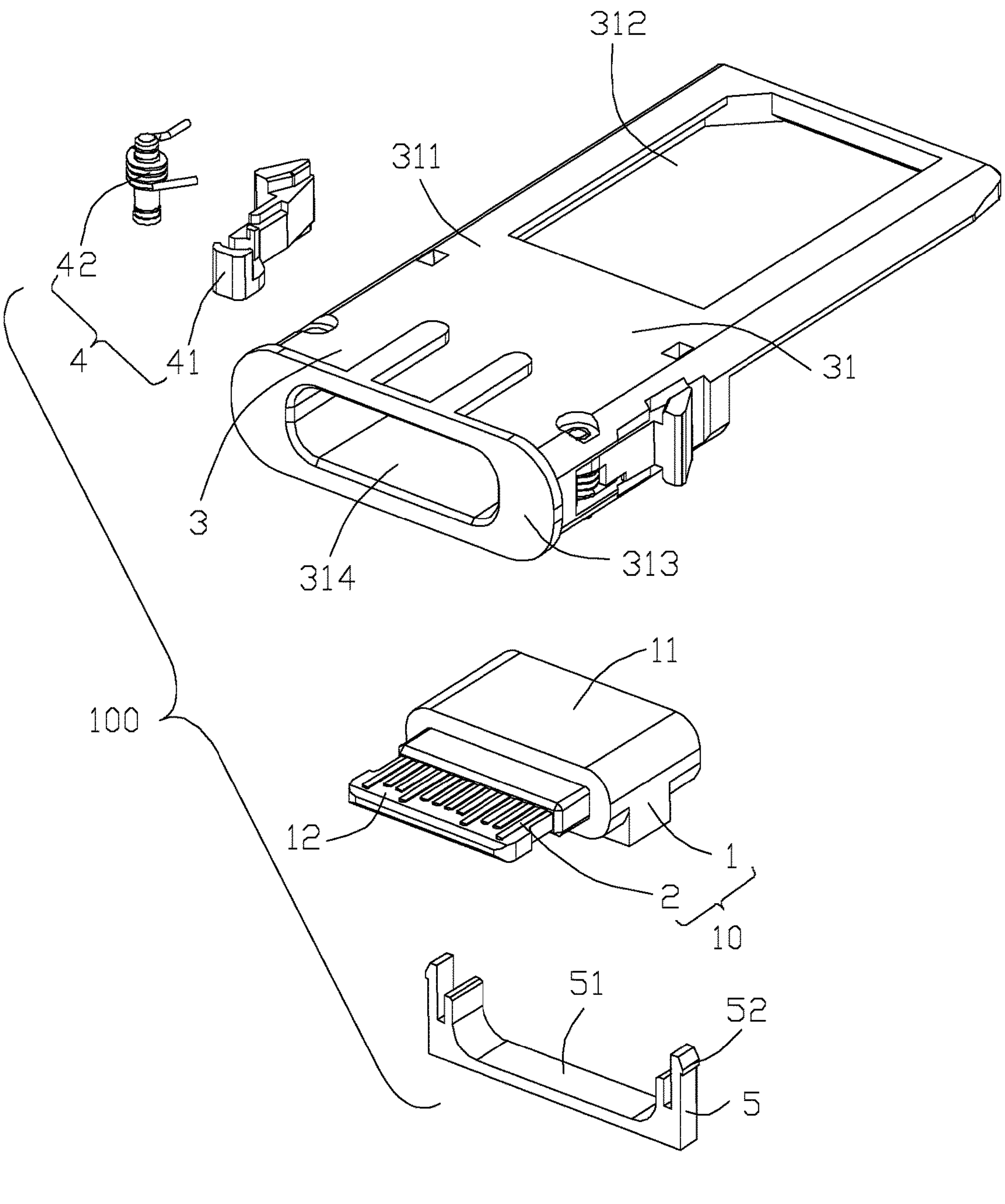
FIG. 7 is a partly exploded view showing the electrical connector.

Referring to FIGS. 7 and 8, the shell 3 defines a mating port 101 at a front portion thereof for mating with a mating/complementary connector. The shell 3 comprises a main portion 31 and a frame portion 32 in front of the main portion 31. The main portion 31 includes an upper wall 311 defining a card receiving cavity 312 at a rear portion, a lower wall 315, and a pair of side walls 316 each defining an accommodating recess 317 and a latching recess 3161 facing inwardly, and a receiving cavity 314 defined therebetween. The upper wall 311 is formed with a pair of resisting members 6 each shaped into a rib configuration formed on a front portion thereof. The main portion 31 further defines a pair of mounting holes 318 at opposite sides thereof. The frame portion 313 defines a pair of ear portions 3131 at opposite sides of the mating port 101 and adaptive to the front face 301 of the electronic device 300, and a pair of edge portions 3132 formed at upper and lower sides thereof. A width of the ear portion 3131 is greater than a thickness of a wall of the main portion 31, and is greater than a vertical dimension of the edge portion 3132.

Referring to FIGS. 7 and 8, the locking mechanism 4 includes a locking member 41 and a resilient member 42. The resilient member 42 includes a bolt 421 and a torsional spring 422 surrounded on the bolt 421. The locking member 41 is formed with a locking portion 411 projecting sidewardly from a rear portion thereof and an insertion hole 412 for insertion of the bolt 421. The fastening mechanism 5 has a resisting portion 51 and a latching portion 52.

Figure 3:
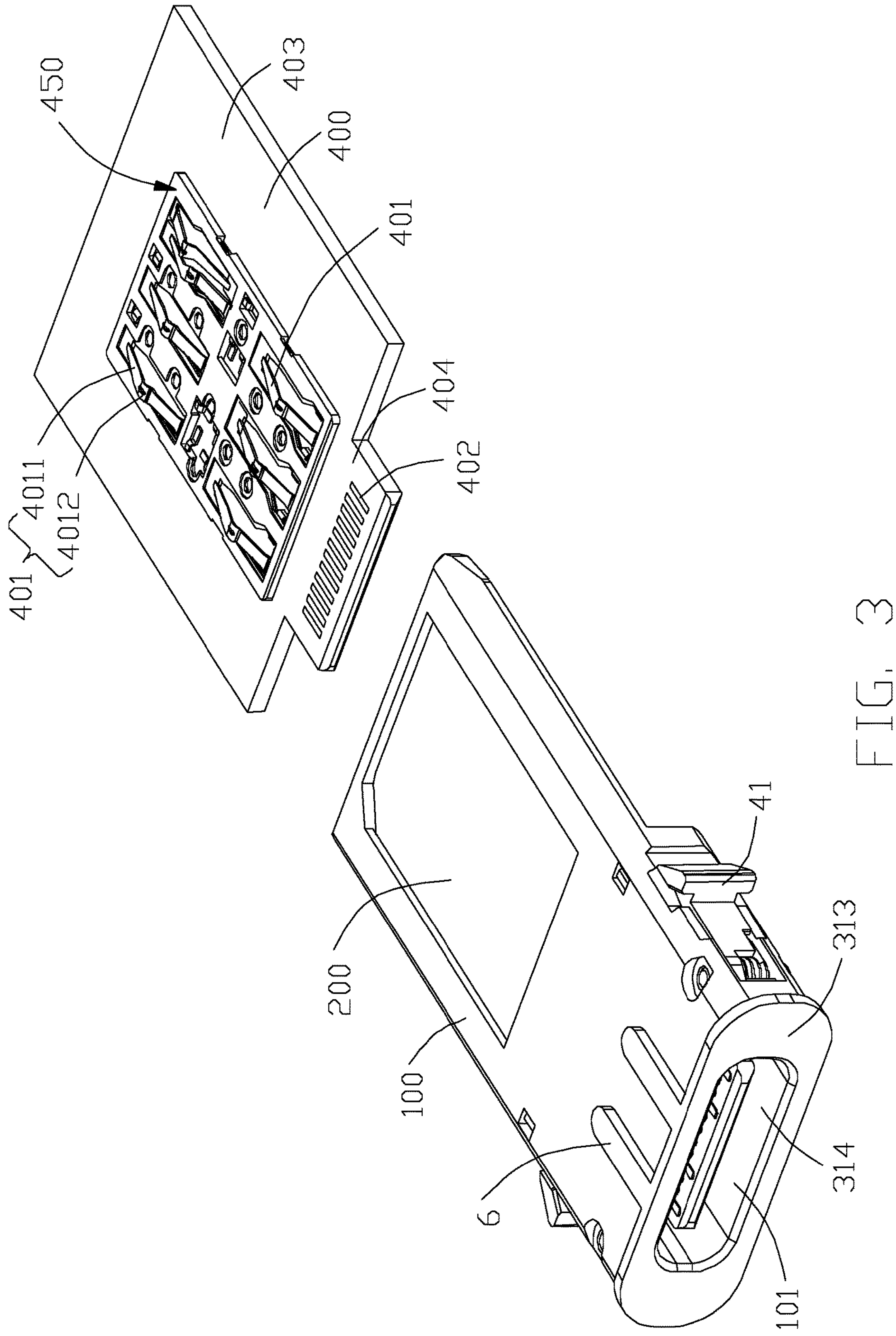
FIG. 3 is a perspective view showing the electrical connector separated from the circuit board.

Referring to FIG. 3, the circuit board 400 comprises a front board portion 404 provided with a plurality of conductive pads 402, a rear board portion 403 on which an electrical card connector 450 is mounted to provide a plurality of compressible contacts 401 compressed by the card 200 and electrically connecting with the card 200. Each compressible contact 401 is formed into inverted V-shape and comprising a pair of resilient beams 4011 resiliently compressed by the card 200 and a conductive portion 4012 between the pair of resilient beams 4011 for contacting with the card 200.

In assembling of the electrical connector 100, the module 10 is received in the receiving cavity 314 of the shell 3. Each bolt 421 is respectively inserted through the mounting hole 318 and the insertion hole 412 to affix the locking member 41 and the torsional spring 422 on the shell 3. The module 10 is fastened to the shell 3 via the fastening mechanism 5. The resisting portion 51 of fastening mechanism 5 resists against the insulative housing 1, and the latching portion 52 latches with the latching recess 3161 of the shell 3.

In assembling the electrical connector 100 into the receiving space (not labeled) of the electronic device 300 through the front opening (not labeled), in conjunction with FIG. 1, the front face of the shell 3 is flush with the front face 301 of the electronic device 300. The connecting portions 22 of the terminals 2 are arranged along the platform 113 in the through hole 112. The front board portion 404 is inserted into the through hole 112 for attaching the connecting portions 22 of the terminals 2 with the conductive pads 401 of the front board portion 404. In conjunction with FIG. 9, the locking portions 304 latch with the engaging shoulders 304. The step portion 3034 is abutted against by the locking portion 411.

Referring to FIGS. 9-12 and 20, when the electrical connector 100 is rejected, two pins L are inserted through the slots 302 to push the tail portions 3031 of the ejecting mechanisms 303, to rotate the ejecting mechanisms 303 about the pivots 3033. The locking portions 411 are pushed by the step portions 3034 to rotate and separate from the corresponding engaging shoulders 304. The pair of resisting members 6 are pushed forwardly by the head portions 3032 of the ejecting mechanisms 303 to thereby eject the electrical connector 100 from the front face 301 of the electronic device 300. The card 200 could be put in or take out from the card receiving cavity 312.

When the card 200 is put in the card receiving cavity 312 from a bottom to top direction and abutted against by upper ledges of the card receiving cavity 312, the electrical connector 100 is pushed into the electronic device 300, the head portions 3032 are pushed by the resisting members 6, the ejecting mechanisms 303 are rotated. The locking portions 411 latch with the engaging shoulders 304.

The mating port 101 is defined in compliance with the USB Type C standard. The electrical connector 100 is adapted for loading the card 200. The electrical connector 100 only use one outside-opened mating port 101 to mate with USB Type C plug and carry the card 200. The space on the mobile phone occupied by one mating port 101 has been saved. The ear portion 3131 has a great width to ease cooperating with a step configuration of the electronic device 300.

A second embodiment shown in FIGS. 13 to 19 is similar to the first embodiment, except that the locking portion 304' is formed on the ejecting mechanism 303', an engaging recess 411' is defined on the side wall 316' of the electrical connector 100', either on the shell 3' or the module 10', and the resisting member 6' is a rearwardly facing face of the electrical connector 100'. The tail portion 3031', the head portion 3032', and the locking portion 304' are disposed around the pivot 3033'. The pivot 303, 303' in the first and second embodiments could be respectively formed into a post 3034' and a torsional spring 3035' encircled around the post 3034'.

When the electrical connector 100' is rejected, two pins L' are inserted through the slots 302' to push the tail portions 3031' of the ejecting mechanisms 303', and the ejecting mechanisms 303' are rotated about the pivots 3033'. The locking portions 304' are thereby rotated outwardly for leaving from the engaging recesses 411'. The head portion 3032' is further rotated and forwardly push the resisting member 6', to thereby eject the electrical connector 100' from the front face 301' of the electronic device 300'. The card 200' could be put in or take out from the card receiving cavity 312.

When the card 200' is loaded in the electrical connector 100', the electrical connector 100' is pushed into the electronic device 300', the head portions 3032' are pushed by the resisting member 6', the ejecting mechanisms 303' are rotated. The locking portions 304' engage with the engaging recesses 411'.

It is to be understood, however, that even though numerous characteristics and advantages of the present invention have been set forth in the foregoing description, together with details of the structure and function of the invention, and changes may be made in detail, especially in matters of shape, size, and arrangement of parts within the principles of the invention to the full extent indicated by the broad general meaning of the terms in which the appended claims are expressed.

What is claimed is:

1. An electrical connector assembly comprising:

a module including an insulative housing and a plurality of terminals affixed to the insulative housing, the insulative housing comprising a base portion and a tongue portion extending forwardly from the base portion, each terminal comprising a contact portion exposed on the tongue portion;

a shell enclosing the module and defining a mating port at a front portion thereof for mating with a mating connector, a card receiving cavity at a rear portion thereof for loading a card, and a pair of latching recesses; and a fastening mechanism having a resisting portion resisting against the insulative housing, and a pair of latching portions latching with the latching recesses of the shell to fasten the module onto the shell.

2. The electrical connector assembly as claimed in claim 1, wherein said shell comprises a main portion including a plurality of walls having an upper wall, a lower wall, and a pair of side walls, and said card receiving cavity is defined at a rear portion of the upper wall.

3. The electrical connector assembly as claimed in claim 2, wherein said shell includes a frame portion formed on a front of the main portion and defines the mating port, said frame portion has a pair of ear portions at opposite sides of the mating port and adaptive to a front face of the electronic device, and a width of said ear portion is greater than a thickness of the side wall of the main portion.

4. An electrical connector assembly as claimed in claim 1, further comprising a circuit board, wherein said circuit board having a front board portion provided with a plurality of conductive pads, said insulative housing defines a through hole extending through the base portion for insertion of the circuit board, and each terminal has a connecting portion positioned in the through hole for electrically connecting with the conductive pads of the circuit board.

5. An electrical connector assembly comprising:

an electronic device comprising at least one ejecting mechanism rotatable about a pivot; and an electrical connector removably received within the electronic device and comprising at least one resisting member, wherein one of the electronic device and the electrical connector is equipped with at lease one locking mechanism, and the other one is formed with at least one engaging portion engaged with a corresponding locking mechanism, when the at least one ejecting mechanism is rotated to drive the at least one locking mechanism to be released from the corresponding engaging portion, and further forwardly push the at least one resisting member to thereby eject the electrical connector from the electronic device.

6. The electrical connector assembly as claimed in claim 5, wherein there are a pair of the ejecting mechanisms, there are a pair of the locking mechanisms formed on the electrical connector, there are a pair of the engaging portions formed into a pair of engaging shoulders on the electronic device, and there are a pair the resisting members.

7. The electrical connector assembly as claimed in claim 6, wherein each said ejecting mechanism comprises a tail portion and a head portion pushing the resisting member, a middle of the head portion formed with a downwardly projecting step portion driving the locking mechanism.

8. The electrical connector assembly as claimed in claim 6, wherein said electrical connector comprises a shell having an upper wall, a lower wall, and a pair of side walls, and each resisting member is shaped into a rib configuration formed on a front portion of the upper wall.

9. The electrical connector assembly as claimed in claim 6, wherein each locking mechanism comprises a locking member having a locking portion projecting sidewardly from a rear portion of the locking member for engaging with the engaging shoulder, a bolt and a torsional spring surrounded on the bolt, and said locking members and the torsional springs are affixed to the shell via the bolts.

10. The electrical connector assembly as claimed in claim 5, wherein said electrical connector includes a shell, there are a pair of the ejecting mechanisms, there are a pair of the locking mechanisms respectively unitarily formed with the ejecting mechanisms, each locking mechanism includes a locking portion and a torsional spring, there are a pair of the engaging portions formed into a pair of engaging recesses on the shell.

11. The electrical connector assembly as claimed in claim 10, wherein said resisting member is formed into a rearwardly facing face of the electrical connector, each ejecting mechanism includes a tail portion and a head portion pushing the resisting member, and the tail portion, the head portion and the locking portion are disposed around the torsional spring and affixed to the pivot via the torsional spring.

12. An electrical connector assembly comprising:

an electrical device defining a receiving space and having a front face located in front of the receiving space and equipped with a front opening in alignment with the receiving space in a front-to-back direction;

a printed circuit board located in a rear portion of the receiving space;

an electrical card connector mounted upon the printed circuit board;

an I/O (Input/Output) connector configured to be removably received within a front portion of the receiving space via said front opening, said I/O connector including:

a terminal module including a plurality of terminals retained in an insulative housing, and a shell enclosing the module and defining a front mating port forwardly exposed to an exterior in the front-to-back direction, in which front contacting sections of said terminals are disposed for mating with a complementary connector, and a rear card receiving cavity for receiving an electronic card which is adapted to be mated with the electrical card connector; wherein the terminal module forms a connecting port located between the mating port and the card receiving cavity in the front-to-back direction, in which rear connecting sections of the terminals are located to be detachably electrically and mechanically connected to the printed circuit board.

13. The electrical connector assembly as claimed in claim 12, wherein said terminal module is configured to be forwardly assembled into the shell from a rear side of the shell along said front-to-back direction, and is detachably fixed within the shell via a fastening mechanism.

14. The electrical connector assembly as claimed in claim 12, wherein one of said electrical device and said I/O electrical connector is equipped with a moveable locking mechanism which is actuated to be disengaged, by a movement of an ejecting mechanism, from a corresponding engaging portion formed on the other of said electrical device and said I/O electrical connector so as to allow the I/O connector to be ejected forwardly and outwardly in the front-to-back direction by said movement of said ejecting mechanism.

15. The electrical connector assembly as claimed in claim 14, wherein said ejecting mechanism is moveable in a pivotal manner, and the electrical card connector includes a plurality of resilient contacts deflectable in a vertical direction perpendicular to said front-to-back direction.

16. The electrical connector assembly as claimed in claim 12, wherein said printed circuit board forms a plurality of conductive pads on a front board portion thereof, by which the printed circuit board is directly mechanically and electrically connected to the connecting sections of the terminals.

17. An electrical connector assembly comprising:

a module including an insulative housing and a plurality of terminals affixed to the insulative housing, the insulative housing comprising a base portion and a tongue portion extending forwardly from the base portion, each terminal comprising a contact portion exposed on the tongue portion;

a shell enclosing the module and defining a mating port at a front portion thereof for mating with a mating connector, and further defining a card receiving cavity at a rear portion thereof for loading a card; and a circuit board; wherein said circuit board has a front board portion provided with a plurality of conductive pads, said insulative housing defines a through hole extending through the base portion for insertion of the circuit board, and each terminal has a connecting portion positioned in the through hole for electrically connecting with the conductive pads of the circuit board.

18. The electrical connector assembly as claimed in claim 17, wherein said circuit board comprises a rear board portion provided with a plurality of compressible contacts, and each compressible contact is formed into inverted V-shape and includes a pair of resilient beams resiliently compressed by the card and a conductive portion between the pair of resilient beams for contacting with the card.

19. The electrical connector assembly as claimed in claim 17, further comprising an electronic device for insertion of the electrical connector, wherein the electrical connector is formed with a pair of locking mechanisms, the electronic device is formed with a pair of ejecting mechanisms and a pair of engaging portions for engaging with corresponding locking mechanisms, and the ejecting mechanisms are rotatable to drive the locking mechanisms to be released from the corresponding engaging portions and forwardly push the electrical connector to thereby eject the electrical connector from the electronic device.

20. The electrical connector assembly as claimed in claim 19, wherein each ejecting mechanism is formed with a downwardly projecting step portion for driving the locking portion, each locking mechanism includes a locking member formed with a locking portion, a bolt, and a torsional spring surrounded on the bolt, and the locking members and the torsional springs are affixed to the shell via the bolts.

* * * * *